UNITED STATES PATENT OFFICE.

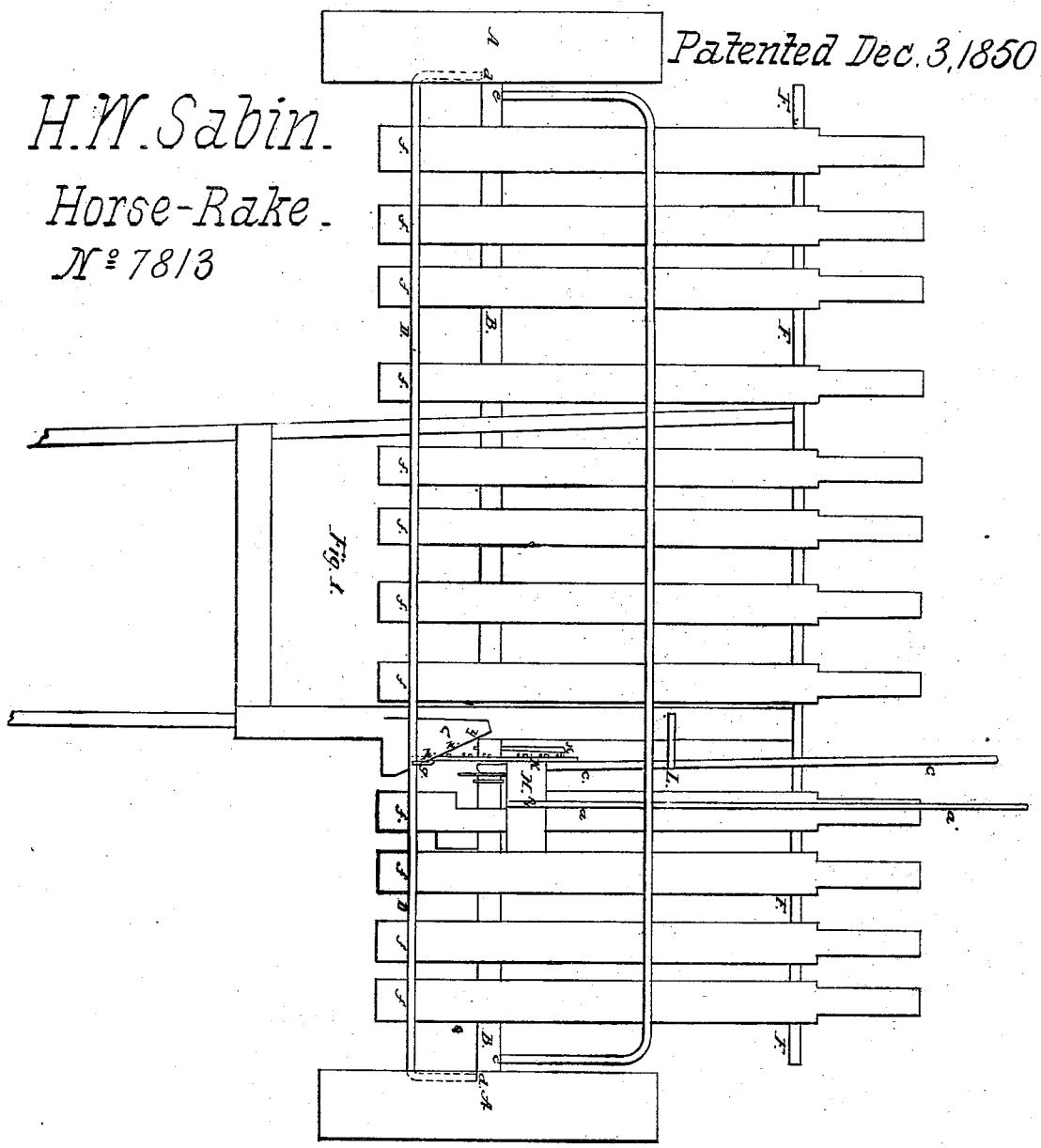
H.W. Sabin.
Horse-Rake.
Nº 7813
Patented Dec. 3, 1850
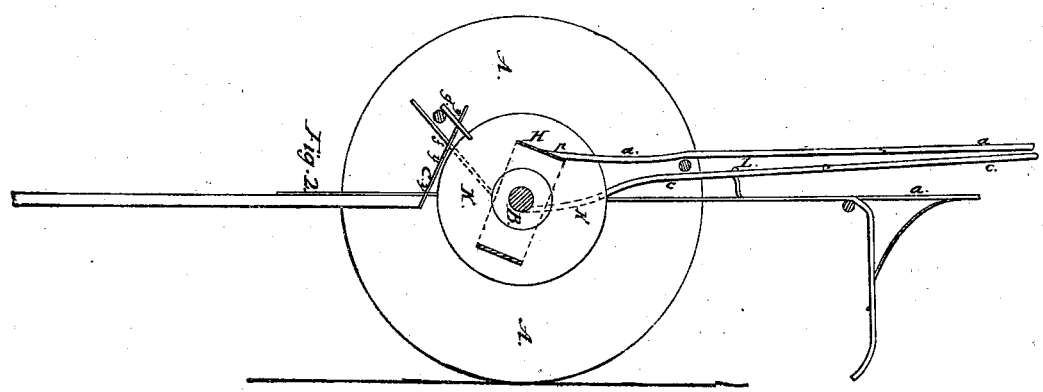

H. W. SABIN, OF CANANDAIGUA, NEW YORK.

IMPROVEMENT IN HORSE-RAKES.

Specification forming part of Letters Patent No. 7,813, dated December 3, 1850.

*To all whom it may concern:*

Be it known that I, H. W. SABIN, of Canandaigua, in the county of Ontario and State of New York, have invented a new and useful Improvement on a Horse-Rake; and I do hereby declare that the following is a full, clear, and exact description of the construction of the same, reference being had to the annexed drawings, making a part of this specification, in which—

Figure 1 represents a top view, and Fig. 2 a transverse section.

Similar letters indicate like parts in each figure.

Letters A A represent the wheels, which are attached to a rotary axle, B B.

D D is a tilting bar, attached to the axle at $d\ d$, and is intended to act upon the stocks to which the teeth of the rake are hung at $f\ f$. It is governed by the handle $a'\ a'$, which is fixed to a coupling, projecting from the edge of which is a pin, $g$, touching the tilting bar D D.

The bar E E, attached to the axle at $e\ e$, is for the purpose of holding the stocks down, and is governed by the handle $a\ a$.

The bar F F supports the stocks at the angle made by the teeth of the rake, and is made firm to the thills extending back. It also answers the purpose of clearing the hay from the points of the teeth as they are raised.

The principal points of my invention consist in the operation of the coupling K. By means of the handle $c\ c$, working upon a fulcrum at L, the coupling is moved to the right or left upon the axle. When moved to the left the clutch $x$, fixed into and revolving with the axle, is caught upon pins $o\ o\ o$, fixed into the left side of the coupling K, Fig. 1. The clutch $x$, being caught upon a pin, turns the coupling, and by that means all the stocks are raised. When the pin $g$, projecting from the coupling, meets the inclined plane C, and moving down the side $y\ y\ y$, the pins clear the clutch and the stocks again fall, and thus by moving the handle $c\ c$, acting as a lever upon the fulcrum L, the operation is repeated at will.

What I claim as my invention, and desire to secure by Letters Patent in my improved horse-rake, is—

The devices for raising the teeth simultaneously to clear them of the hay and dropping them again by means of the apparatus, substantially as described, being worked by the draft of the team, when thrown into gear, at the will of the operator.

The above specification of my improved horse-rake signed and witnessed this 5th day of October, 1850.

HARVEY W. SABIN.

Witnesses:
J. H. ADAMS, Jr.,
H. H. YOUNG.